US012561003B2

(12) United States Patent
Tirmizi et al.

(10) Patent No.: US 12,561,003 B2
(45) Date of Patent: Feb. 24, 2026

(54) HAPTIC FEEDBACK HEADPIECE

(71) Applicants: Lemon Inc., Grand Cayman (KY);
**Beijing Zitiao Network Technology
Co., Ltd.**, Beijing (CN)

(72) Inventors: Syed Asad Tirmizi, Los Angeles, CA
(US); Ali Israr, Los Angeles, CA (US);
Zachary Schwemler, Los Angeles, CA
(US); Dehao Zhao, Beijing (CN);
Erting Cheng, Beijing (CN); **Kaochoy
Saetern**, Los Angeles, CA (US)

(73) Assignees: LEMON INC., Grand Cayman (KY);
**BEIJING ZITIAO NETWORK
TECHNOLOGY CO., LTD.**, Beijing
(CN)

( * ) Notice: Subject to any disclaimer, the term of this
patent is extended or adjusted under 35
U.S.C. 154(b) by 0 days.

(21) Appl. No.: 18/220,074

(22) Filed: Jul. 10, 2023

(65) Prior Publication Data

US 2025/0004559 A1      Jan. 2, 2025

Related U.S. Application Data

(63) Continuation      of      application      No.
PCT/CN2023/104251, filed on Jun. 29, 2023.

(51) Int. Cl.
*G06F 3/01*          (2006.01)
*G06F 3/16*          (2006.01)

(52) U.S. Cl.
CPC .............. *G06F 3/016* (2013.01); *G06F 3/012*
(2013.01); *G06F 3/165* (2013.01)

(58) Field of Classification Search
CPC ........... G06F 3/016; G06F 3/012; G06F 3/165

USPC .............................................. 345/156–169, 8
See application file for complete search history.

(56) References Cited

U.S. PATENT DOCUMENTS

| | | | | |
|---|---|---|---|---|
| 8,977,376 | B1 * | 3/2015 | Lin ........................ | G01H 11/06 |
| | | | | 381/326 |
| 10,390,139 | B2 * | 8/2019 | Biggs ................... | H04R 1/1075 |
| 12,343,761 | B2 * | 7/2025 | Snow ...................... | B06B 1/045 |

(Continued)

FOREIGN PATENT DOCUMENTS

| | | |
|---|---|---|
| CN | 105744415 A | 7/2016 |
| CN | 108434726 A | 8/2018 |

(Continued)

OTHER PUBLICATIONS

International Search Report received for PCT Patent Application
No. PCT/CN2023/104251, mailed on Dec. 8, 2023, 5 pages.

*Primary Examiner* — Kwin Xie
(74) *Attorney, Agent, or Firm* — Faegre Drinker Biddle &
Reath LLP

(57) ABSTRACT

A haptic feedback apparatus is described. The haptic feed-
back apparatus comprises a headpiece that conforms to a
neurocranium of a user and a haptic processor. The head-
piece comprises left and right haptic actuators. The haptic
processor is configured to process an input signal and
activate the left and right haptic actuators according to the
input signal. The left and right haptic actuators are located
on the headpiece to abut the neurocranium of the user when
the headpiece is worn by the user. The left and right haptic
actuators provide haptic feedback to the user via the neu-
rocranium upon activation by the haptic processor.

18 Claims, 7 Drawing Sheets

(56)          References Cited

U.S. PATENT DOCUMENTS

| | | | |
|---|---|---|---|
| 2006/0142657 A1* | 6/2006 | Quaid | A61B 90/37 |
| | | | 600/424 |
| 2015/0130706 A1* | 5/2015 | Lacroix | A63F 13/23 |
| | | | 345/156 |
| 2018/0092444 A1* | 4/2018 | Ward | A45B 25/143 |
| 2020/0033601 A1* | 1/2020 | Magrath | G06F 3/011 |
| 2020/0160602 A1* | 5/2020 | Ghatak | G06Q 30/0242 |
| 2022/0062766 A1* | 3/2022 | Dom | H04S 7/304 |

FOREIGN PATENT DOCUMENTS

| | | |
|---|---|---|
| CN | 109669530 A | 4/2019 |
| CN | 112053449 A | 12/2020 |
| TW | 202223596 A | 6/2022 |
| WO | 2022/046375 A1 | 3/2022 |

* cited by examiner

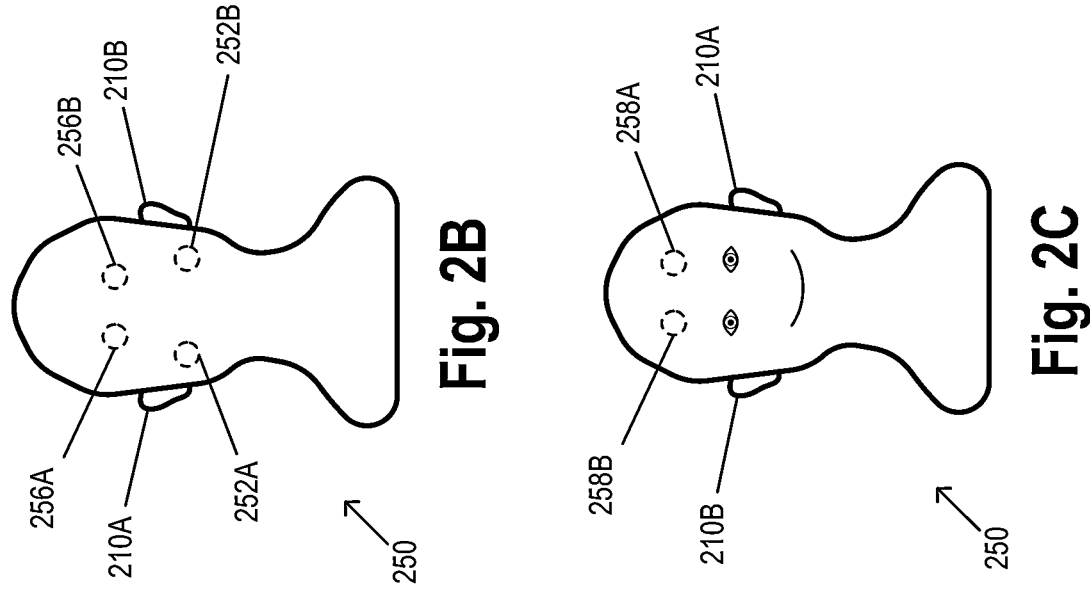
Fig. 2B
Fig. 2C
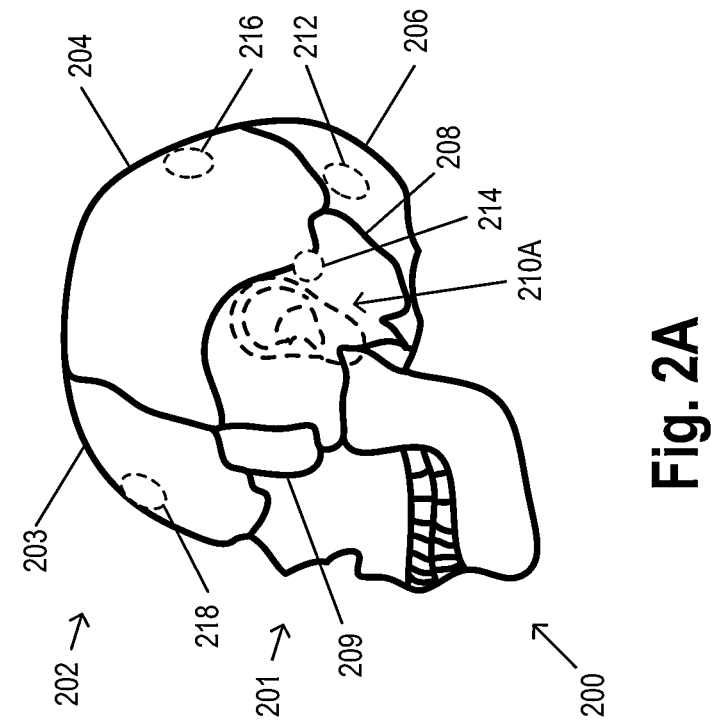
Fig. 2A

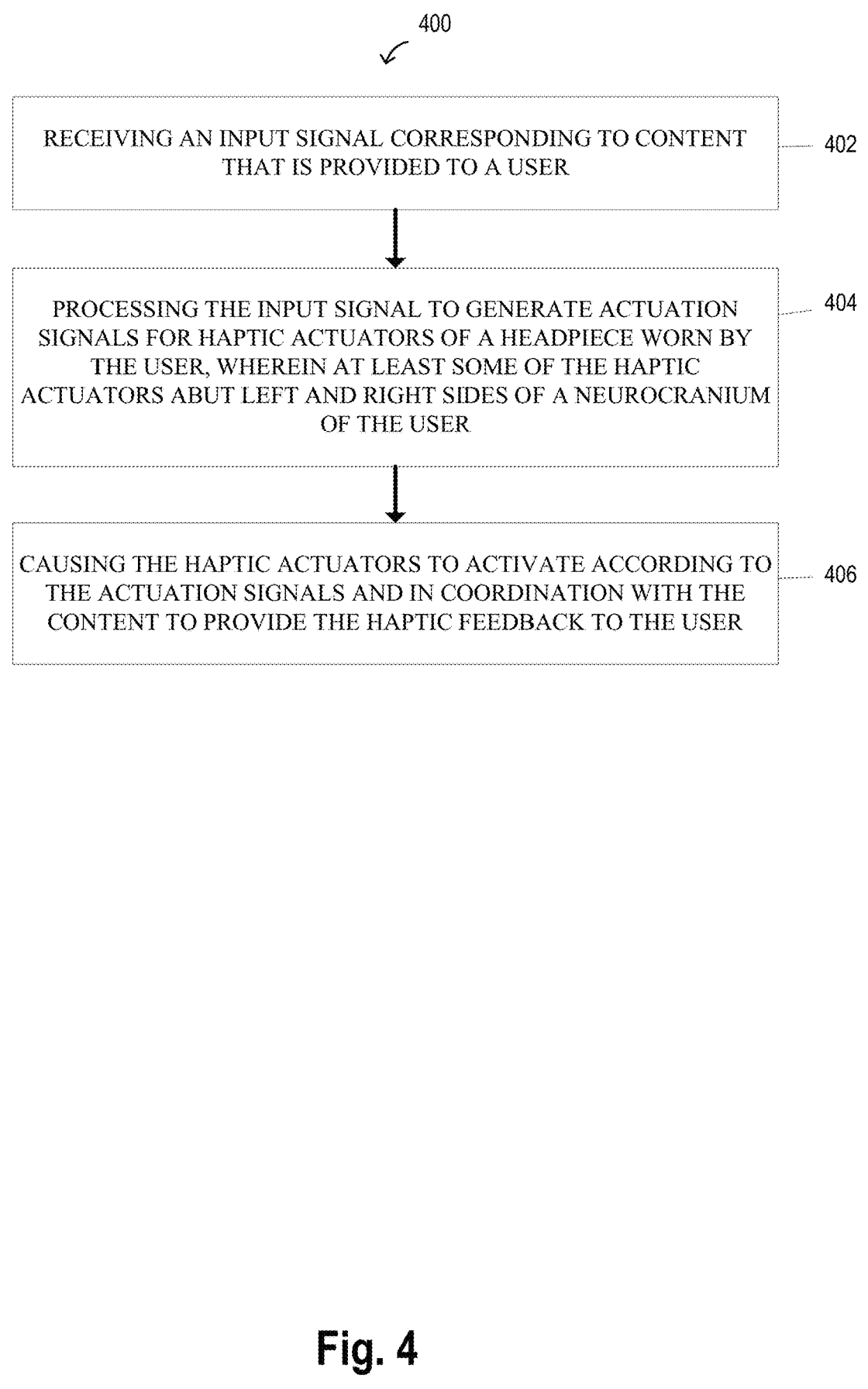

400

RECEIVING AN INPUT SIGNAL CORRESPONDING TO CONTENT THAT IS PROVIDED TO A USER — 402

PROCESSING THE INPUT SIGNAL TO GENERATE ACTUATION SIGNALS FOR HAPTIC ACTUATORS OF A HEADPIECE WORN BY THE USER, WHEREIN AT LEAST SOME OF THE HAPTIC ACTUATORS ABUT LEFT AND RIGHT SIDES OF A NEUROCRANIUM OF THE USER — 404

CAUSING THE HAPTIC ACTUATORS TO ACTIVATE ACCORDING TO THE ACTUATION SIGNALS AND IN COORDINATION WITH THE CONTENT TO PROVIDE THE HAPTIC FEEDBACK TO THE USER — 406

Fig. 4

HAPTIC FEEDBACK HEADPIECE

BACKGROUND

Haptics is an under-utilized sensory modality in many consumer electronic products. Its main deployment is on haptic devices such as hand-held computing devices (e.g., mobile phones or hand-held game devices) and hand-held controllers that contain haptic actuators. This is in part because the human hand has the highest tactile perceptual acuity. Although other body locations such as feet, head, and neck may support a good perception of tactile stimuli, these locations are not effectively utilized by haptic devices. Such devices may cause fatigue or discomfort to a user, or interfere with audio devices in proximity to the haptic devices, etc.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to providing haptic feedback.

In one aspect, a haptic feedback apparatus is provided. The apparatus comprises: a headpiece that conforms to a neurocranium of a user, the headpiece comprising left and right haptic actuators; a haptic processor configured to process an input signal and activate the left and right haptic actuators according to the input signal. The left and right haptic actuators are located on the headpiece to abut the neurocranium of the user when the headpiece is worn by the user. The left and right haptic actuators provide haptic feedback to the user via the neurocranium upon activation by the haptic processor.

In another aspect, a haptic feedback apparatus is provided. The haptic feedback apparatus comprises an extended reality (XR) headset having a visual display, a left haptic actuator, and a right haptic actuator. The XR headset conforms to a skull of a user. The apparatus also comprises a haptic processor configured to process an input signal and activate the left and right haptic actuators according to the input signal. The left and right haptic actuators are located on the XR headset to abut a neurocranium of the user when the XR headset is worn by the user. The left and right haptic actuators provide haptic feedback to the user via the neurocranium upon activation by the haptic processor.

In yet another aspect, a method for providing haptic feedback is provided. The method comprises: receiving an input signal corresponding to content that is provided to a user; processing the input signal to generate actuation signals for haptic actuators of a headpiece worn by the user, wherein at least some of the haptic actuators abut left and right sides of a neurocranium of the user; and causing the haptic actuators to activate according to the actuation signals and in coordination with the content to provide the haptic feedback to the user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 1 shows a block diagram of an example of a haptic feedback system, according to an example embodiment.

FIGS. 2A, 2B, and 2C show diagrams of example locations for haptic actuators for a headpiece, according to an example embodiment.

FIGS. 3A, 3B, and 3C show diagrams of an example headpiece and headset for a user, according to an example embodiment.

FIG. 4 shows a flowchart of an example method for providing haptic feedback, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a headpiece having haptic actuators for providing haptic feedback to a user. The headpiece conforms to a neurocranium of the user, for example, a lower or upper rear portion of the user's skull, one or more sides of the user's skull, an upper front portion of the user's skull, or other suitable location. The haptic actuators may be located on left and right sides of the user's skull and may be activated in response to a haptic processor. The haptic processor may process a suitable input signal, such as a haptic input signal, an audio signal, or a video signal and activate the haptic actuators according to the input signal. With the haptic actuators on opposing sides of the user's skull, the haptic processor may activate the haptic actuators to create a "stereo" effect with left and right channels of haptic feedback. In some examples, the haptic processor may cause a flow of haptic feedback intensity among the haptic actuators, such as left, to center (e.g., both left and right haptic actuators), to right. In still further examples, the haptic processor may coordinate with other haptic actuators that are external to the headpiece, such as in a hand controller, knee sensor, or foot sensor.

Figure 1:
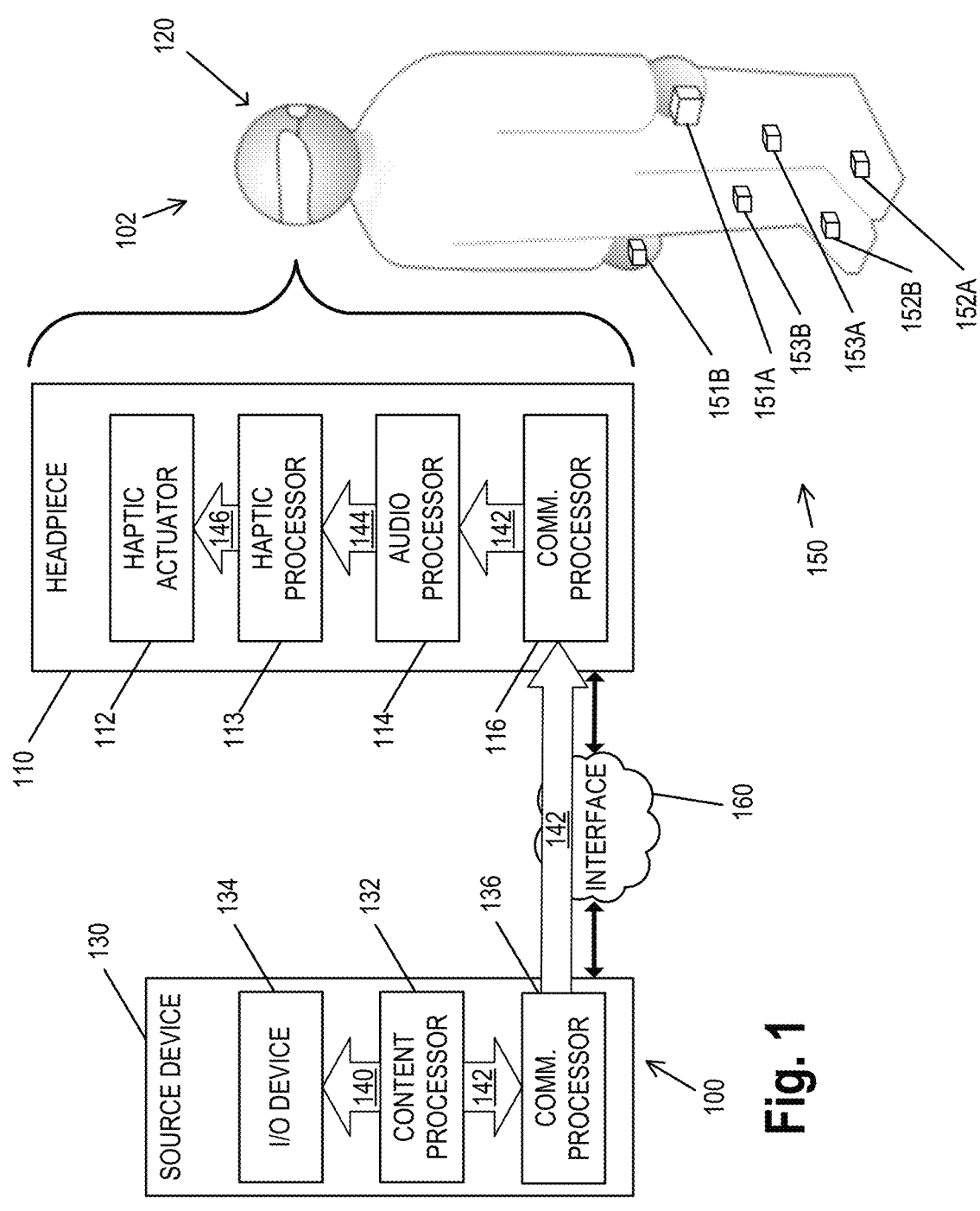

This and many further embodiments for a haptic feedback system, headpiece, headset, and method are described herein. For instance, FIG. 1 shows a block diagram of an example of a haptic feedback system 100, according to an example embodiment. The haptic feedback system 100 may be used by a user 102 during a user session where the user wears a haptic feedback apparatus having a headpiece 110 with haptic actuators 112. In various examples, the user session may be a virtual reality (VR) session (including video see through), an augmented reality (AR) session (including optical see through), a content consuming session (e.g., watching a video, listening to music, playing a game), or other suitable user session.

The haptic actuators 112 may comprise one or more of voice coil motors (VCM), electro-tactile devices, linear resonant actuators, eccentric rotary mass devices, or other suitable electro-mechanical devices. In some examples, the haptic actuators 112 (or mechanical components therein) move and/or vibrate to cause haptic feedback for the user 102 when the haptic actuators 112 abut the user 102.

The headpiece 110 further includes a haptic processor 113 configured to process an input signal related to the user session and activate the haptic actuators 112 according to the input signal. For example, the haptic processor 113 may generate actuation signals for one, two, or more of the haptic actuators 112. Accordingly, the haptic actuators 112 provide haptic feedback to the user 102 upon activation by the haptic processor 113 according to the actuation signals. The haptic feedback may be provided to the user 102 to confirm a simulated button press by the user (e.g., in VR or AR), enhance a viewing experience (e.g., add a vibration for a car crash in a movie), enhance a listening experience (e.g., add a vibration for a bass or kick drum sound), provide feedback for actions performed by the user 102 (e.g., add a vibration in time with footsteps or climbing movements), or other suitable scenarios. In some examples, an intensity of haptic feedback is fixed for all events. In other examples, different intensities of haptic feedback are used for different events (e.g., high intensity for footsteps, but lower intensity for button presses). In still other examples, the intensities of haptic feedback are based on other criteria, such as a state of the user, actions the user performs, a heart rate or perspiration level of the user, etc. In one such example, higher intensity haptic feedback levels are used in response to indications that the user is experiencing cyber-sickness.

Generally, the headpiece 110 is configured to conform to a neurocranium of the user 102. For example, the headpiece 110 may be formed to wrap around a rear portion of the skull or head of the user 102. In some examples, at least a portion of the headpiece 110 is formed from a flexible or semi-flexible material (e.g., foam, rubber) to conform to the neurocranium. In some examples, the headpiece 110 is configured to removably engage a headset 120, such as a VR headset or AR headset. In this way, the headpiece 110 provides an optional upgrade to the headset 120, adding haptic feedback to an existing visual display and/or speaker of the headset 120, but may still be removed to reduce weight and improve comfort of wearing the headset 120. In still other examples, the headpiece 110 is integral with the headset 120 and not removable. Although not shown, the headpiece 110 may include a harness, straps, bands, or other suitable components configured to hold the headpiece 110 against the head of the user 102 (e.g., as a head-mounted apparatus) and/or against the headset 120.

The headpiece 110 comprises two, three, or more haptic actuators 112. Generally, the headpiece 110 comprises a left haptic actuator 112 and a right haptic actuator that are located on the headpiece 110 to abut the neurocranium of the user when the headpiece 110 is worn by the user 102. Advantageously, the haptic actuators 112 may be provided along at least left and right sides of the neurocranium to provide haptic feedback for left, right, and center (e.g., both left and right) feedback. In some examples, the headpiece

110 comprises additional haptic actuators 112 located at other locations of the neurocranium (e.g., front, top).

As described above, the haptic processor 113 processes an input signal related to the user session and activates the haptic actuators 112 according to the input signal. Generally, the haptic processor 113 generates respective actuation signals for the haptic actuators 112 to activate and/or deactivate the haptic actuators 112, change intensity of the haptic feedback, etc. In some examples, the haptic processor 113 uses an amplifier (not shown) to provide a suitable actuation signal to the haptic actuators 112. The input signal may indicate one or more of a duration of an impulse, a flow of the impulse from various actuators, simultaneous activation of multiple actuators, etc. In some examples, the actuations are a function of the human perceptual envelope and the input signal identifies a predetermined function or pattern of actuations that correspond to various haptic illusions, such as jumping, flow, directionality, etc.

In various examples, the input signal is a haptic input signal, an audio signal, a video signal, or a combination thereof. The haptic input signal may be a signal intended for haptic feedback and may be received from an audio processor 114 or a source device 130 (e.g., a source of content), described below. The audio signal may be an audio channel associated with content consumed by the user 102, such as the audio channel for a movie being watched, a game being played, or captured by microphones of the headset 120. The video signal may be a video channel associated with the content. In some examples, the haptic processor 113 generates an actuation signal based on the video signal, for example, to cause a vibration of the haptic actuators 112 when a flash of light occurs in the video signal (e.g., corresponding to a flash of lightning or firework display) or other suitable characteristic of the video signal.

In some examples, the headpiece 110 further comprises an audio processor 114 configured to receive an audio signal. As described above, the audio signal may be an audio channel associated with content consumed by the user 102, but the audio processor 114 may be configured to more efficiently process the audio signal, for example, by having dedicated audio decoders, digital signal processors, and/or filters. In one example, the audio signal is a multi-channel audio signal such as a stereo audio signal or surround sound audio signal. Accordingly, the audio processor 114 may include a stereo processor, Dolby Digital processor, Digital Theater Systems (DTS) processor, or other suitable audio processor. In one example, the audio processor 114 extracts a low frequency effects (LFE) channel from the audio signal and provides the LFE channel to the haptic processor 113. The audio processor 114 may further process and/or filter the LFE channel before providing it to the haptic processor 113. For example, the audio processor 114 may filter high frequency components or components that are outside a desired operational window of the haptic actuator 112. In some examples, filtering and/or removing components of the audio signal reduces battery consumption of the haptic actuator 112 and may also protect the haptic actuator 112 from adverse conditions (e.g., signal overload, excessive vibration).

In some examples, the audio processor 114 extracts a low frequency portion of the audio signal and provides the extracted low frequency portion to the haptic processor 113. For example, the audio processor 114 may use a suitable filter, such as a low-pass filter (not shown), to extract and provide to the haptic processor 113 an input signal with a suitable frequency range for the haptic actuators 112, such as 20 Hz to 350 Hz or 20 Hz to 150 Hz. In some examples, the audio processor 114 extracts a left low frequency portion and a right low frequency portion from left and right channels of a multi-channel audio signal (e.g., front left, front right, left surround, right surround) as the input signal.

In still other examples, the audio processor 114 may generate an input signal for the haptic processor 113 based on a change in a characteristic of the audio signal. For example, when a change in amplitude or signal power of the audio signal reaches a predetermined threshold, the audio processor 114 may generate a suitable input signal so that haptic feedback is provided when, for example, a sudden sound is heard (e.g., lightning or fireworks), even when the audio signal does not have a low frequency portion (e.g., below 400 Hz).

Although the haptic processor 113 is shown as part of the headpiece 110 in the example of FIG. 1, the haptic processor 113 may be located external to the headpiece 110 in other examples. For example, the haptic processor 113 may be located on the source device 130 or on a separate module, such as a computing device carried by the user 102 when using the headpiece 112 or smartphone of the user 102. The haptic processor may be implemented as a software module, hardware module, or combination thereof. Similarly, the audio processor 114 is shown as part of the headpiece 110, but may be located external to the headpiece 110 in other examples. The haptic processor 113 and the audio processor 114 may be co-located (e.g., at the source device 130 or other computing device), or may be located separately from each other. In some examples, one or both of the haptic processor 113 and the audio processor 114 are located in a cloud computing environment where they receive the input signal from the source device 130 and cause the haptic actuators 112 to activate, for example, by sending actuation signals to the haptic actuators 112.

When the haptic processor 113 and/or the audio processor 114 are located on the headpiece 110, the headpiece 110 may further comprise a communication processor 116 to facilitate sending and/or receiving signals, such as input signals for the haptic processor 113 and/or audio processor 114, actuation signals for haptic actuators 112 (on and/or external to the headpiece 110), or other suitable signals. In some examples, the communication processor 116 also facilitates sending and/or receiving of other signals for the headset 120, such as audio and/or video signals. In some examples, the communication processor 116 is configured to coordinate haptic feedback provided by left and right haptic actuators of the headpiece 110 with haptic feedback provided by external haptic actuators, described below.

The headset 120 may be a VR headset, AR headset, or extended reality (XR) headset, in various examples. The headset 120 may comprise one or more of a display, speakers, processors, memory, attachment devices for engaging the head of the user 102, or other suitable elements. The headset 120 may include one or more of buttons or other control inputs, spatial orientation devices, haptic actuators, or other suitable elements. The spatial orientation device may be one or more of an accelerometer, gyroscope, inertial measurement unit (IMU), angle finder, or other suitable device.

As described above, the user 102 may wear the headpiece 110 during a user session, such as a VR session, AR session, a content consuming session (e.g., watching a video, listening to music, playing a game), or other suitable user session. The haptic feedback system 100 may further include the source device 130 that is a source for content of the user session. Generally, the source device 130 may be any suitable type of computing device, such as a smartphone, personal computer, laptop computer, tablet, server, cloud computer or cloud service platform, or other suitable computing device or system. In some examples, the source device 130 is part of a social media platform or service, image or video sharing platform or service, cloud gaming platform or service, or provides other suitable applications to users. The source device 130 may be configured to execute one or more software applications (or "applications") and/or services and/or manage hardware resources (e.g., processors, memory, etc.), which may be utilized by the user 102, for example. In some examples, the source device 130 is an extended reality (XR) compatible device (e.g., encompassing VR and AR) that may provide suitable inputs to an XR device, such as the headset 120.

The source device 130 comprises a content processor 132 configured to generate appropriate signals for the user session, such as one or more of video signals for a video display, audio signals for speakers, or haptic input signals for haptic feedback. As such, the content processor 132 may include one or more of video decoders (or transcoders), audio decoders (or transcoders), digital signal processors, filters, or other suitable processors. In some examples, the content processor 132 includes one or more of a GPU, a CPU, or an AI engine. The source device 130 may include an input/output (I/O) device 134, such as a display (e.g., LCD or LED display or monitor), speakers, keyboard, mouse, microphones, cameras, haptic actuators, lights (e.g., RGB lighting), or other suitable I/O devices. In some examples, audio, video, and/or haptic input signals are provided to two or more of the I/O device 134, the headpiece 110, and/or the headset 120. For example, an audio signal may be provided to a speaker (I/O device 134) to provide audio to the user 102 and also to the audio processor 114 to provide haptic feedback to the user 102. As another example, a video signal may be provided to an LCD monitor (I/O device 134) and to the haptic processor 113 to provide haptic feedback to the user 102.

The source device 130 may further comprise a communication processor 136 that provides the audio signals, video signals, and/or haptic input signals to the headpiece 110 via the communication processor 116. In some examples, the communication processor 116 and 136 are communicatively coupled over an interface 160. In some examples, the communication processor 136 and the communication processor 116 are configured to communicate using a suitable communication protocol, such as universal datagram protocol (UDP), where the communication processor 136 implements a UDP server and the communication processor 116 implements a UDP client.

The interface 160 may comprise a wired and/or direct connection, for example, using a data bus or suitable cable (e.g., Universal Serial Bus, multi-function data port, Ethernet, etc.). In other examples, the interface 160 may comprise one or more networks such as local area networks (LANs), wide area networks (WANs), enterprise networks, the Internet, etc., and may include one or more of wired and/or wireless portions. The communication processors 116 and 136 may include at least one wired or wireless network interface that enables communication with each other (or an intermediate device, such as a Web server or database server) via the interface 160. Examples of such a network interface include but are not limited to an IEEE 802.11 wireless LAN (WLAN) wireless interface, an Ethernet interface, a Universal Serial Bus (USB) interface, a cellular network interface, a Bluetooth™ interface, or a near field communication (NFC) interface.

As described above, the haptic feedback system 100 may include the haptic actuators 112 on the headpiece 110 and may further include external devices 150, such as one or more haptic devices 151, haptic devices 152, haptic devices 153, or other suitable external devices. In the example shown in FIG. 1, the external devices 150 include hand controllers 151A and 151B, worn (e.g., as a glove, ring, or wristband) and/or held in left and right hands of the user 102. The external devices 150 may further include foot controllers 152A and 152B, worn and/or placed on left and right feet (or shoes) of the user 102. The external devices 150 may also include knee controllers (or sensors) 153A and 153B, worn and/or placed on left and right legs of the user 102, for example, on, below, or adjacent to the knees. Other external devices 150 may be worn adjacent to elbows, knees, forearms, etc. of the user 102. Generally, the external devices 150 may include one or more of buttons or other control inputs, spatial orientation devices, haptic actuators, or other suitable elements. In some examples, the external devices 150 include a communication processor, similar to the communication processor 116 or 136, for communication with the source device 130 and/or headpiece 110.

The external devices 150 may provide input signals to the haptic processor 113 via the communication processor 116, in some examples. In one such example, the input signal corresponds to a button press on the hand controller 151A, a change in orientation of the hand controller 151B, a detection of a footstep by the foot controller 152A, or other suitable inputs. In some examples, the haptic processor 113 provides haptic feedback, based on input signals from the external devices 150 or the source device 130, that corresponds to various types of locomotion, such as walking on grass, strafing (side-stepping), walking up steps on different materials (stone vs. carpet), climbing, ziplining, or other locomotion. Advantageously, these forms of locomotion may be more easily conveyed to the user 102 via haptic feedback by the haptic actuators 112 through the user's neurocranium rather than through audio or video devices (I/O device 134) alone, promoting immersion in an XR environment. Moreover, the haptic processor 113 may provide haptic feedback configured for scenarios that may cause cyber-sickness, where the haptic feedback reduces a perceived intensity of the cyber-sickness by the user.

Haptic feedback provided to the head of the user 102 may improve a user session by providing confirmation of actions taken by the user. For example, the haptic processor 113 may be configured to provide haptic feedback via the haptic actuators 112 in response to the user using their fingers or hands to type on a virtual keyboard (i.e., haptic feedback of a keypress), pressing buttons, or manipulating other virtual (or augmented reality) controls that may be displayed by the headset 120. In this way, the haptic feedback system 100 may provide a "bare hand" haptic interaction where the user 102 may extend their fingers and hands in a more natural manner, without having to hold a controller or other physical device. In various examples, the haptic processor 113 may provide suitable haptic feedback or cues to signal a beginning, culmination, or progress of various tasks, increasing barehand interaction efficiency and an overall user experience. For example, each time a virtual button is pressed, or an item is dragged, in an XR environment, the user 102 may feel a click sensation on the head that confirms the button press.

In the example shown in FIG. 1, the content processor 132 generates content signals 140 for the I/O devices, where the content signals 140 may include audio or video signals to drive speakers, a display, etc. of the source device 130. In other examples, the content signals 140 are provided to the headset 120 (e.g., for a display or speakers of the headset 120). The content processor 132 may also provide input signals 142 to the communication processor 136 for transfer to the headpiece 110. In some examples, the input signals 142 are the same as the content signals 140 (i.e., audio and/or video signals). In other examples, the input signals 142 are dedicated haptic input signals. For example, the input signals 142 may be generated based on a state of the user (e.g., walking, running, crouching, reaching out an arm, bending a finger). As one such example, a left side haptic input signal that causes haptic feedback on a left side of the head is generated in response to a left step by the user, while a right side haptic input that causes haptic feedback on a right side of the head is generated in response to a right step by the user. Similar haptic feedback may be generated that corresponds to hand or finger movements, arm movements, etc., in other examples.

The communication processor 136 may provide the signals 142 to the communication processor 116 over the interface 160, for example, using the UDP protocol as described above. The communication processor 116 provides the signals 142 to the audio processor 114 and/or the haptic processor 113, in various examples. In some examples, the audio processor 114 processes the signal 142 (e.g., an audio signal) to generate an input signal 144 for the haptic processor 113. In other examples, the signal 142 contains the input signal 144. The haptic processor 113 receives the input signal 144 (or 142) and generates actuation signals 146 for the haptic actuators 112.

FIGS. 2A, 2B, and 2C show diagrams of example locations for haptic actuators for the headpiece 110, according to an example embodiment. FIG. 2A shows a left side view of a skull 200 of the user 102, FIG. 2B shows a rear view of a head 250 of the user 102, and FIG. 2C shows a front view of the head 250. The skull 200 has a facial skeleton 201 and a neurocranium 202. The neurocranium 202 includes a frontal bone 203, left and right parietal bones 204, an occipital bone 206, left and right temporal bones 208, and a sphenoid bone 209. Ears 210 (left ear 210A, right ear 210B) of the user 102 are also shown to improve clarity.

Generally, the haptic actuators 112 include at least one pair of left and right haptic actuators 112, located on the headpiece 110 to abut left and right sides of the neurocranium. In one example, the left and right haptic actuators 112 are located on the headpiece 110 to abut locations 212 (252A, 252B), adjacent to left and right sides of the occipital bone 206 when the headpiece 110 is worn by the user 102. In another example, the left and right haptic actuators 112 are located on the headpiece 110 to abut locations 214, adjacent to left and right temporal bones of the neurocranium, respectively, when the headpiece 110 is worn by the user 102. In yet another example, the left and right haptic actuators 112 are located on the headpiece 110 to abut locations 216 (256A, 256B), adjacent to left and right sides of the parietal bones 204. In still another example, the left and right haptic actuators 112 are located on the headpiece 110 to abut locations 218 (258A, 258B), adjacent to left and right sides of the frontal bone 203. Although only four such locations of the haptic actuators 112 have been described, other locations may be used instead of, or in addition to, the locations 212, 214, 216, and 218.

The haptic actuators 112 may be located to abut any suitable location about the neurocranium 202. In some examples, locations are configured such that the haptic actuators 112 provide vestibular stimulation, affecting the inner ear and sense of balance of the user 102. In some scenarios, haptic feedback that provides vestibular stimulation may reduce a feeling of sensory mismatch (e.g., cybersickness) that may be experienced in virtual reality environments. In some examples, locations are configured to reduce shaking of the headpiece 110 and/or headset 120, for example, using locations 214 or 212 that are more centrally located within the headset 120 so as to exert less torque that may rotate the headset 120. In still other examples, the locations are configured to be located away from pressure points of the headset 120 to avoid vibrations that may tend to dislodge the headset 120.

Figure 3C:
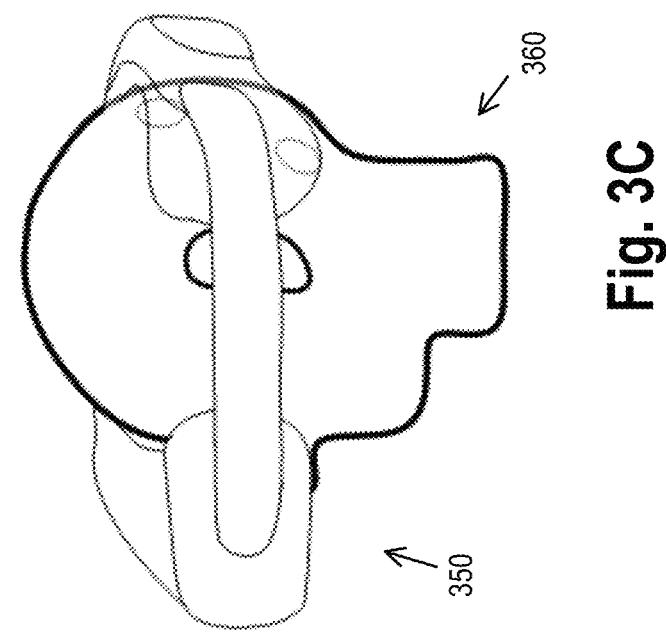
Figure 3A:
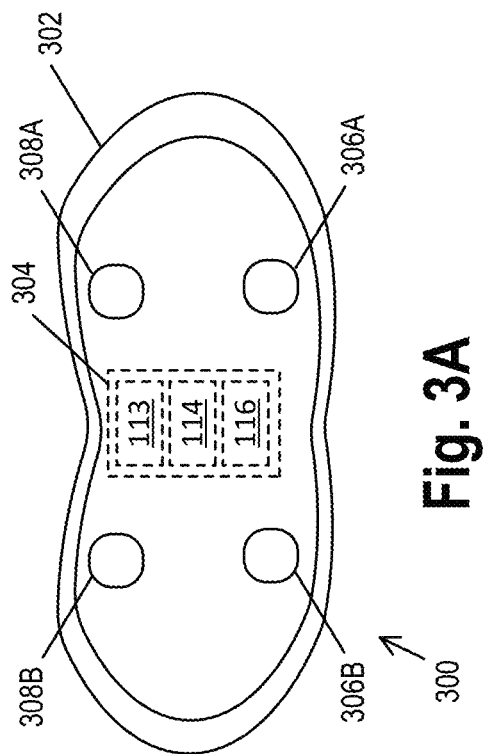
Figure 3B:
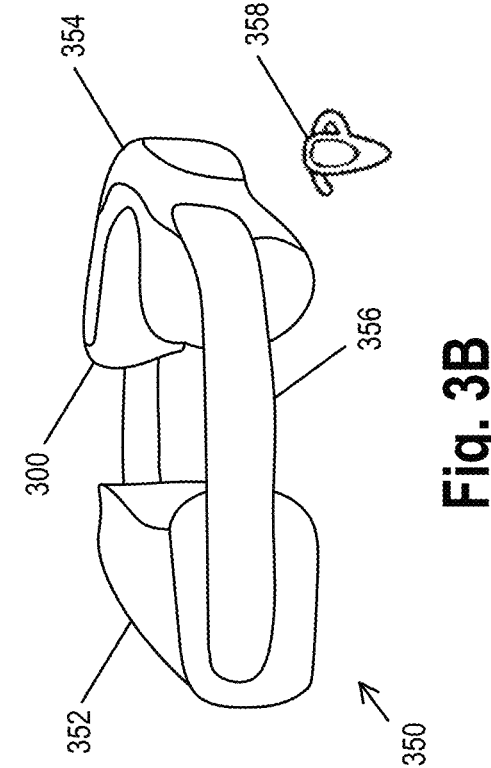

FIGS. 3A, 3B, and 3C show diagrams of an example headpiece 300 and headset 350 for a user, according to an example embodiment. FIG. 3A shows a front view of the headpiece 300, FIG. 3B shows a left side view of the headset 350 with the headpiece 300 attached, and FIG. 3C shows a left side view of the headset 350 being worn by a user 360. The headpiece 300 may generally correspond to the headpiece 110 and comprises a frame 302, a processor module 304, left and right occipital haptic actuators 306A and 306B, and left and right parietal bone haptic actuators 308A and 308B. The processor module 304 may include one or more of the haptic processor 113, the audio processor 114, and/or the communication processor 116. The processor module 304 may further comprise a battery module (not shown), communication and/or charging ports (e.g., USB-C ports, not shown), or other suitable components. The left and right occipital haptic actuators 306A and 306B may generally correspond to locations 252A and 252B of the head 250, while left and right parietal bone haptic actuators 308A and 308B may generally correspond to locations 256A and 256B of the head 250.

As shown in FIG. 3B, the headset 350 comprises a front portion 352, a rear portion 354, and a connecting member 356 that connects the front portion 352 and the rear portion 354. The headset 350 may generally correspond to the headset 120. The frame 302 of the headpiece 300 is shown engaged with the rear portion 354, for example, using snaps, Velcro, magnets, or other suitable fastening devices. The front portion 352 comprises one or more displays (e.g., LCD or LED displays). The displays may be opaque displays, such as in a VR headset, or pass-through displays that allow natural light to pass through the front portion 352 to the user 360, such as in an AR headset. The headset 350 may further comprise one or more speakers, spatial orientation devices, processors, batteries, antenna, or other suitable elements, in the front portion 352 and/or the rear portion 354. In some examples, the speaker is an external device 358, such as a Bluetooth headset or earpiece.

Although only one headpiece 300 is shown engaged with the headset 350, in some examples, two or more separate headpieces may be engaged with the headset 350. For example, a front headpiece may engage the front portion 352 and provide haptic actuators that abut the locations 218, while a rear headpiece may engage the rear portion 354 and provide haptic actuators that abut the locations 212, 214, and/or 216, or other suitable locations. In still other examples, a single headpiece (not shown) is configured to engage both the front portion 352 and the rear portion 354. The single headpiece may have multiple haptic actuators for the different locations described above and may be configured as a skull cap, for example.

Using multiple haptic actuators 306 and 308 on opposing sides of the head of the user 360, the headpiece 300 may provide improved haptic feedback to the user 360. More specifically, using left and right haptic actuators 306A and 306B (or left and right haptic actuators 308A and 308B), for example, the haptic processor 113 of the processor module 304 may activate the haptic actuators 306 to create a "stereo" effect with left and right channels of haptic feedback.

Providing a satisfactory user session in a VR or AR environment may rely upon accurate tracking of head movements of the user 360. For example, as the user 360 rotates their head, a display within the headset 350 should be updated to correspond to a new orientation of the head. Generally, one or more spatial orientation devices within the headset 350 provide orientation feedback for these movements and changes in orientation, but haptic feedback may, in some scenarios, introduce noise or otherwise reduce accuracy of the orientation feedback, reducing a quality of the user session. In some examples, the haptic processor 113 filters a frequency range corresponding to an interference range of the spatial orientation device from the actuation signals generated for the haptic actuators 306 and/or 308. For example, an accelerometer within the headset 350 may have a sampling rate of 60 Hz such that vibration (i.e., haptic feedback) in an interference range of 50 Hz to 70 Hz causes reduced performance of the accelerometer and reduced quality of the user session. Accordingly, the haptic processor 113 may filter actuation signals that would cause a vibration within the interference range. In some examples, filtering in the interference range is performed on an audio signal by the audio processor 114 before the filtered signal is provided to the haptic processor 113. In other examples, separate filters are used after the actuation signals are generated.

When the user session includes audio provided to the user 360 through speakers, the haptic processor 113 may generate actuation signals that reduce or avoid interference with the audio through the speakers. As one example, when an audio signal includes a portion with a frequency of 200 Hz, the haptic processor 113 may avoid actuation signals that would cause a vibration at 200 Hz, at harmonics of 200 Hz, or other frequencies that may cause undesirable levels of constructive or destructive interference of the 200 Hz audio signal. As another example, the haptic processor 113 may select a haptic actuator for actuation that is located further from the speakers to reduce interference (e.g., selecting a haptic actuator at location 218 instead of at location 214).

As described above, the haptic processor 113 may be configured to avoid interference with speakers or spatial orientation devices. In other examples, the haptic processor 113 reduces or avoids interference with other sensors, displays, or components of the headset 350 or the haptic feedback system 100. For example, the haptic processor 113 may avoid interference with a heart rate sensor by filtering actuation signals within an interference range of the heart rate sensor.

In some examples, the haptic processor 113 may cause a flow of increasing or decreasing haptic feedback intensity among the haptic actuators, such as from the left haptic actuator, to center (e.g., both left and right haptic actuators), to the right haptic actuator. As an example, during a first time interval, the haptic processor 113 activates the left haptic actuator 306A to have a high intensity feedback and deactivates the right haptic actuator 306B (i.e., no feedback). During a second time interval after the first time interval, the haptic processor 113 activates the left haptic actuator 306A to have a low intensity feedback and activates the right haptic actuator 306B to have a low intensity feedback. At a third time interval after the second time interval, the haptic processor 113 deactivates the left haptic actuator 306A (i.e., no feedback) and activates the right haptic actuator 306B to have a high intensity feedback.

In other examples, the haptic processor 113 may cause a flow of haptic feedback between other haptic actuators of the headpiece 300, such as from haptic actuator 306A to haptic actuator 308A, or from haptic actuator 308B to 306A, etc. In still other examples, the haptic processor 113 may cause a flow of haptic feedback in different patterns, such as in a circle around the back of the head (i.e., 306A, to 306B, to 308B, to 308A), in a circle around the top of the head (i.e., from locations 218 to 216).

In still other examples, the haptic processor 113 may coordinate with other haptic actuators that are external to the headpiece 300, such as haptic actuators in the hand controller 151 and/or the foot controllers 152. In these examples, the haptic processor 113 may cause a flow of haptic feedback from the headpiece 300 to the hand controller 151 and then to the foot controller 152, for example.

FIG. 4 shows a flowchart of an example method 400 for providing haptic feedback, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the headpiece 110 (e.g., via the haptic processor 113, the audio processor 114), or other suitable computing device.

Method 400 begins with step 402. At step 402, an input signal corresponding to content that is provided to a user is received. For example, the input signals 142 or 144 are received by the haptic processor 113. In some examples, the content comprises one or more of audio content or video content that is provided to the user via an extended reality (XR) headset. For example, the content may be music, video, a gaming session, a VR session, AR session, Video See Through (VST) session, Optical See Through (OST) session, or other content provided by (or augmented by) the source device 130 (via the content processor 132).

At step 404, the input signal is processed to generate actuation signals for haptic actuators of a headpiece worn by the user. At least some of the haptic actuators abut left and right sides of a neurocranium of the user. For example, the haptic processor 113 generates actuation signals 146 for the haptic actuators 112, the haptic actuators 306, or the haptic actuators 308. In one example, the input signal is an audio signal from the content and processing the input signal comprises extracting a low frequency portion of the audio signal to generate the actuation signals. In another example, the audio signal is a multi-channel audio signal and the low frequency portion comprises a low frequency effects channel of the multi-channel audio signal. In yet another example, the audio signal is a multi-channel audio signal and extracting the low frequency portion comprises extracting a left low frequency portion and a right low frequency portion from left and right channels of the multi-channel audio signal. In some examples, the actuation signals are configured to provide feedback for actual walking or stepping movements of the user during a VST session, which may reduce cyber-sickness and improve user perception of the walking movements. In this way, the haptic feedback may provide reassurance to a user when the user's field of view is being projected indirectly through an XR headset.

At step 406, the haptic actuators are caused to activate according to the actuation signals and in coordination with the content to provide the haptic feedback to the user. For example, the haptic actuators 112, the haptic actuators 306, and/or the haptic actuators 308 are activated to provide haptic feedback to the user 102 or 360.

In some examples, step 404 comprises filtering, from the actuation signals, a frequency range corresponding to an interference range of a spatial orientation device. For example, the haptic processor 113 may filter a frequency range corresponding to an accelerometer of the headset 350, as described above.

In some examples, step 404 comprises generating the actuation signals to cause a flow of haptic feedback intensity among the haptic actuators. For example, the haptic processor 113 may cause a flow of increasing or decreasing haptic feedback intensity among the haptic actuators 112, 306, 308, and/or haptic actuators of the external devices 150.

Figure 5:
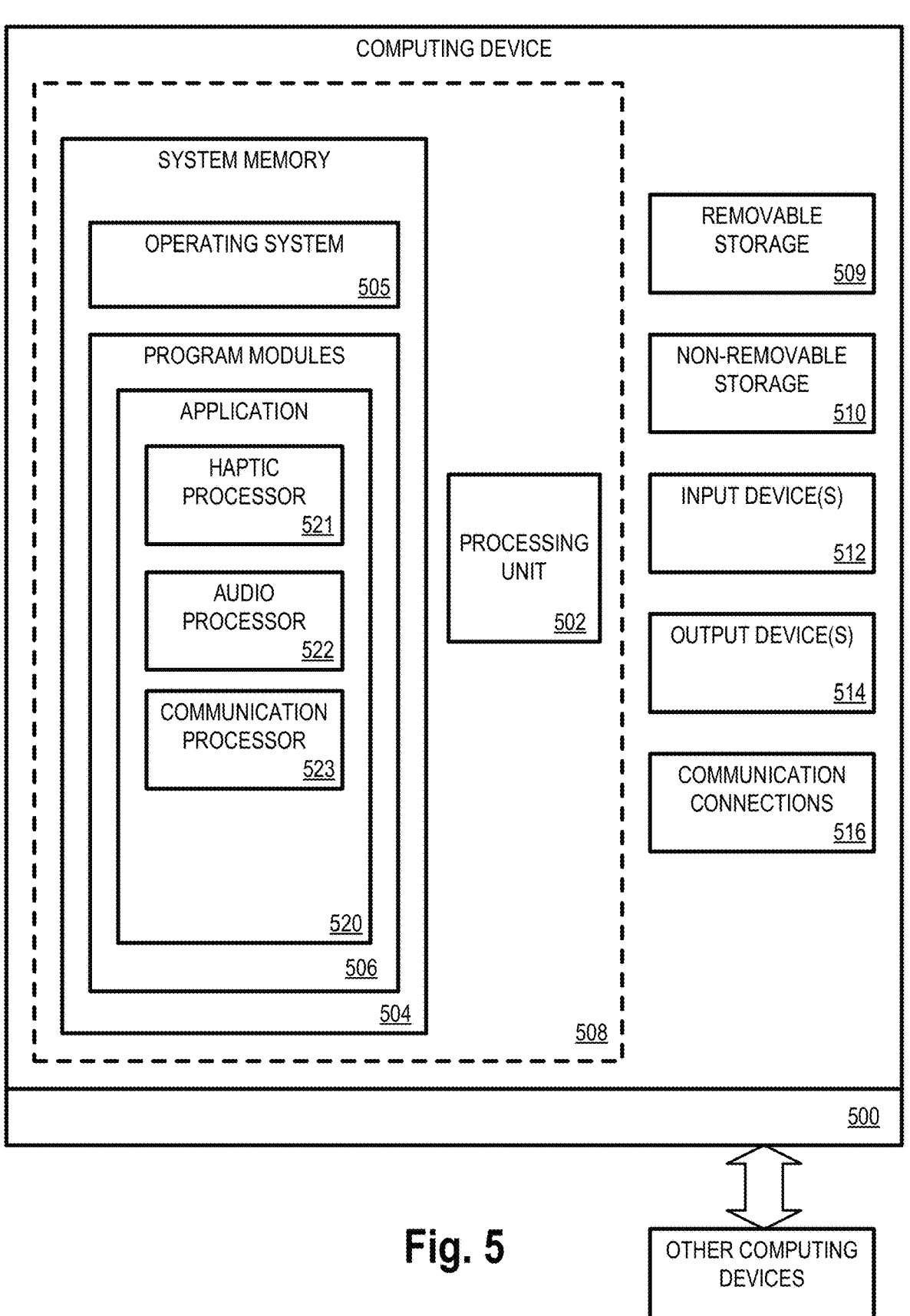
FIG. 5 is a block diagram illustrating example physical components of a computing device with which aspects of the disclosure may be practiced.
Figure 6:
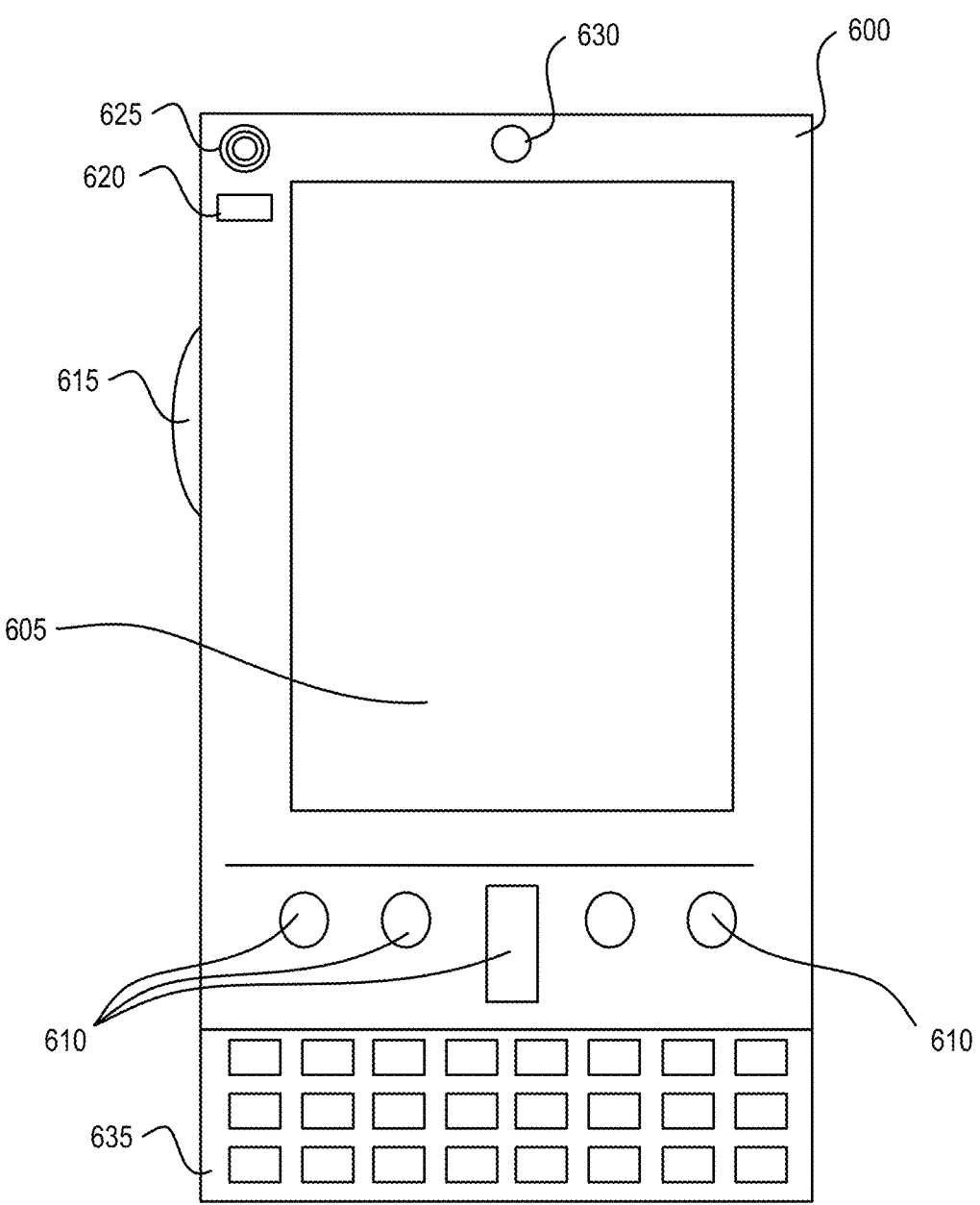
FIGS. 6 and 7 are simplified block diagrams of a mobile computing device with which aspects of the present disclosure may be practiced.
Figure 7:
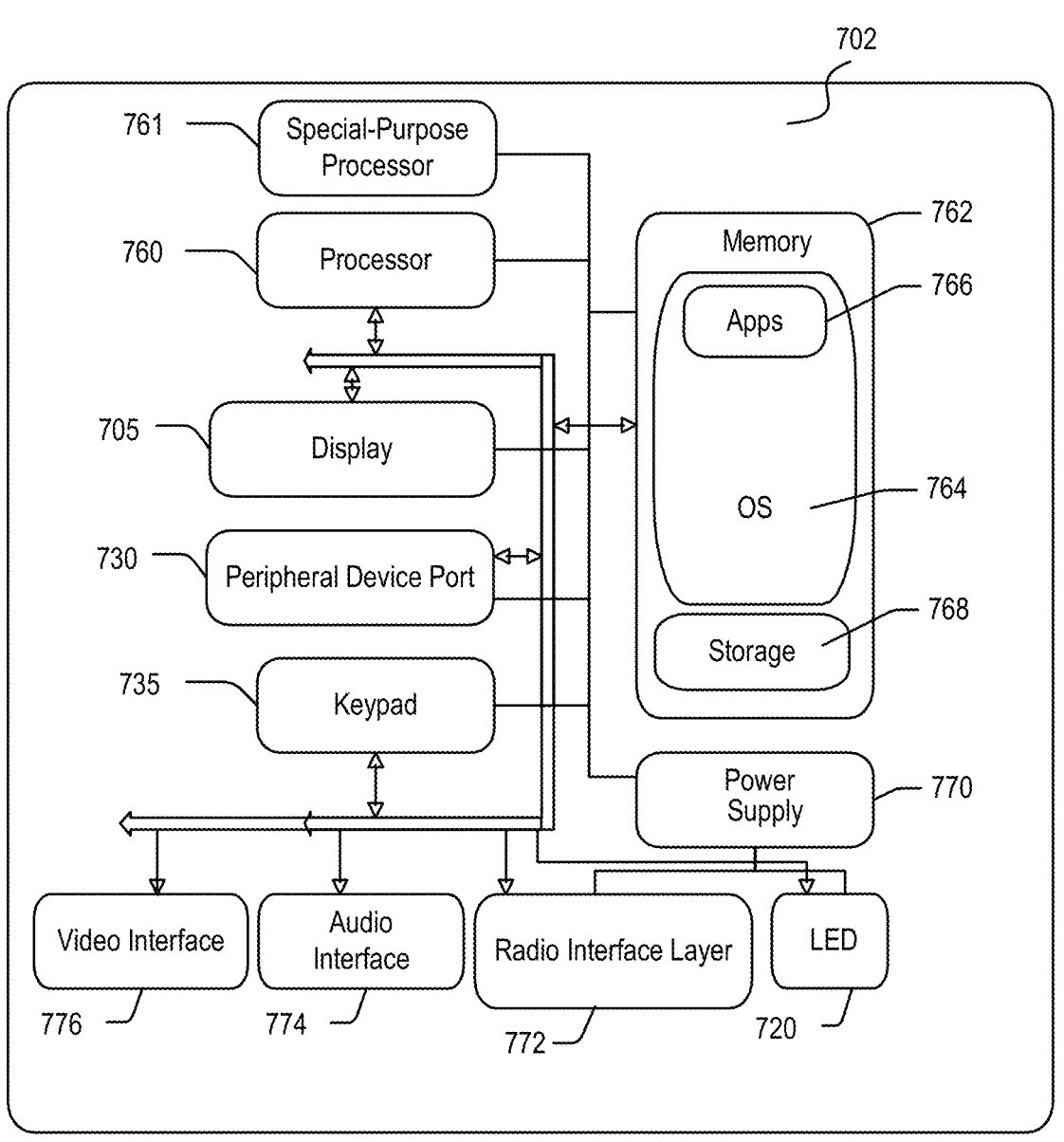

FIGS. 5, 6, and 7 and the associated descriptions provide a discussion of a variety of operating environments in which aspects of the disclosure may be practiced. However, the devices and systems illustrated and discussed with respect to FIGS. 5, 6, and 7 are for purposes of example and illustration and are not limiting of a vast number of computing device configurations that may be utilized for practicing aspects of the disclosure, as described herein.

FIG. 5 is a block diagram illustrating physical components (e.g., hardware) of a computing device 500 with which aspects of the disclosure may be practiced. The computing device components described below may have computer executable instructions for implementing a haptic feedback application 520 on a computing device (e.g., headpiece 110, headset 120, headpiece 300, headset 350), including computer executable instructions for haptic feedback application 520 that can be executed to implement the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running haptic feedback application 520, such as one or more components with regard to FIGS. 1 and 3 and, in particular, haptic processor 521 (e.g., corresponding to haptic processor 113), audio processor 522 (e.g., corresponding to audio processor 114), and communication processor 523 (e.g., corresponding to communication processor 116).

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., haptic feedback application 520) may perform processes including, but not limited to, the aspects, as described herein. Other program modules that may be used in accordance with aspects of the present disclosure, and in particular for providing haptic feedback, may include haptic processor 521, audio processor 522, and communication processor 523.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6 and 7 illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 600 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer.

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 625 (e.g., audio transducer 625 illustrated in FIG. 6). In the illustrated embodiment, the visual indicator 720 is a light emitting diode (LED) and the audio transducer 625 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like.

A mobile computing device 600 implementing the system 702 may have additional features or functionality. For example, the mobile computing device 600 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 600 and stored via the system 702 may be stored locally on the mobile computing device 600, as described above, or the data may be stored on any number of storage media that may be accessed by the device via the radio interface layer 772 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 6 and 7 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

What is claimed is:

1. A haptic feedback apparatus, comprising:
a headpiece that conforms to a neurocranium of a user, the headpiece comprising left and right haptic actuators;
a haptic processor configured to process an input signal and activate the left and right haptic actuators according to the input signal; and
an audio processor configured to receive an audio signal, extract a low frequency portion of the audio signal in a frequency range from 20 Hz to 350 Hz by filtering a high frequency component outside the frequency range, and provide the extracted low frequency portion of the audio signal to the haptic processor as the input signal,
wherein the input signal is further processed by filtering, from the input signal, a frequency range corresponding to an interference range of a spatial orientation device,
wherein the left and right haptic actuators are located on the headpiece to abut the neurocranium of the user when the headpiece is worn by the user; and
wherein the left and right haptic actuators provide haptic feedback to the user via the neurocranium upon activation by the haptic processor.

2. The haptic feedback apparatus of claim 1, wherein the haptic processor is integral with the headpiece.

3. The haptic feedback apparatus of claim 1, wherein the haptic processor activates the left and right haptic actuators based on the extracted low frequency portion of the audio signal.

4. The haptic feedback apparatus of claim 1, wherein:

the headpiece is configured to removably engage an extended reality (XR) headset; and the left and right haptic actuators are located on the headpiece to abut the neurocranium of the user when the headpiece is engaged with the XR headset and the XR headset is worn by the user.

5. The haptic feedback apparatus of claim 1, wherein left and right haptic actuators are located on the headpiece to abut locations adjacent to left and right sides of an occipital bone of the neurocranium when the headpiece is worn by the user.

6. The haptic feedback apparatus of claim 1, wherein the left and right haptic actuators are located on the headpiece to abut locations adjacent to left and right temporal bones of the neurocranium, respectively, when the headpiece is worn by the user.

7. The haptic feedback apparatus of claim 1, the haptic feedback apparatus further comprising:

a communications processor configured to coordinate the haptic feedback provided by the left and right haptic actuators with haptic feedback provided by external haptic actuators.

8. A haptic feedback apparatus, comprising:

an extended reality (XR) headset having a visual display, a left haptic actuator, and a right haptic actuator, the XR headset conforming to a skull of a user; and a haptic processor configured to process an input signal and activate the left and right haptic actuators according to the input signal; and an audio processor configured to receive an audio signal, extract a low frequency portion of the audio signal in a frequency range from 20 Hz to 350 Hz by filtering a high frequency component outside the frequency range, and provide the extracted low frequency portion of the audio signal to the haptic processor as the input signal, wherein the input signal is further processed by filtering, from the input signal, a frequency range corresponding to an interference range of a spatial orientation device, wherein the left and right haptic actuators are located on the XR headset to abut a neurocranium of the user when the XR headset is worn by the user; and wherein the left and right haptic actuators provide haptic feedback to the user via the neurocranium upon activation by the haptic processor.

9. The haptic feedback apparatus of claim 8, wherein the haptic processor is integral with the XR headset.

10. The haptic feedback apparatus of claim 8, wherein the haptic processor activates the left and right haptic actuators based on the extracted low frequency portion of the audio signal.

11. The haptic feedback apparatus of claim 8, wherein the left and right haptic actuators are located on the XR headset to abut locations adjacent to left and right sides of an occipital bone of the neurocranium when the XR headset is worn by the user.

12. The haptic feedback apparatus of claim 8, wherein the left and right haptic actuators are located on the headset to abut locations adjacent to left and right temporal bones of the neurocranium, respectively, when the XR headset is worn by the user.

13. The haptic feedback apparatus of claim 8, the apparatus further comprising:

one or more external haptic actuators that are external to the XR headset and abut the user; and a communications processor configured to coordinate the haptic feedback provided by the left and right haptic actuators with haptic feedback provided by the one or more external haptic actuators.

14. A method for providing haptic feedback, the method comprising:

receiving an input signal corresponding to content that is provided to a user;

processing the input signal to generate actuation signals for haptic actuators of a headpiece worn by the user, wherein at least some of the haptic actuators abut left and right sides of a neurocranium of the user; and causing the haptic actuators to activate according to the actuation signals and in coordination with the content to provide the haptic feedback to the user, wherein the input signal is an audio signal from the content and processing the input signal comprises extracting a low frequency portion of the audio signal in a frequency range from 20 Hz to 350 Hz by filtering a high frequency component outside the frequency range to generate the actuation signals, wherein the input signal is further processed by filtering, from the actuation signals, a frequency range corresponding to an interference range of a spatial orientation device.

15. The method of claim 14, wherein the content comprises one or more of audio content or video content that is provided to the user via an extended reality (XR) headset.

16. The method of claim 14, wherein the audio signal is a multi-channel audio signal and the low frequency portion comprises a low frequency effects channel of the multi-channel audio signal.

17. The method of claim 14, wherein the audio signal is a multi-channel audio signal and extracting the low frequency portion comprises extracting a left low frequency portion and a right low frequency portion from left and right channels of the multi-channel audio signal.

18. The method of claim 14, wherein processing the input signal to generate the actuation signals comprises generating the actuation signals to cause a flow of haptic feedback intensity among the haptic actuators.

\* \* \* \* \*